US011992006B2

(12) United States Patent
Kasamatsu et al.

(10) Patent No.: US 11,992,006 B2
(45) Date of Patent: May 28, 2024

(54) ORGAN PRESERVATION SYSTEM

(71) Applicant: SCREEN HOLDINGS CO., LTD., Kyoto (JP)

(72) Inventors: Hiroo Kasamatsu, Kyoto (JP); Syuhei Yoshimoto, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 217 days.

(21) Appl. No.: 17/378,060

(22) Filed: Jul. 16, 2021

(65) Prior Publication Data
US 2022/0022448 A1 Jan. 27, 2022

(30) Foreign Application Priority Data
Jul. 21, 2020 (JP) ................. 2020-124161

(51) Int. Cl.
*A01N 1/02* (2006.01)
(52) U.S. Cl.
CPC ................. *A01N 1/0247* (2013.01)
(58) Field of Classification Search
None
See application file for complete search history.

(56) References Cited

U.S. PATENT DOCUMENTS

| 4,242,883 A * | 1/1981 | Toledo-Pereyra | ....... A01N 1/02 435/284.1 |
|---|---|---|---|
| 5,974,686 A | 11/1999 | Nomura et al. | |
| 2004/0170950 A1 * | 9/2004 | Prien | ..................... A01N 1/0247 435/284.1 |
| 2011/0294108 A1 * | 12/2011 | Argoudelis | .......... A01N 1/0247 435/284.1 |
| 2013/0175276 A1 | 7/2013 | Gleichauf et al. | |
| 2015/0342177 A1 | 12/2015 | Hassanein et al. | |

(Continued)

FOREIGN PATENT DOCUMENTS

| DE | 10141386 A1 * | 3/2003 | ............ C12M 23/10 |
|---|---|---|---|
| JP | H11-29178 A | 2/1999 | |

(Continued)

OTHER PUBLICATIONS

Notice of Reasons for Refusal issued in corresponding Japanese Patent Application No. JP 2020-124161, dated Mar. 26, 2024.

*Primary Examiner* — William H. Beisner
(74) *Attorney, Agent, or Firm* — Rimon P.C.

(57) ABSTRACT

An organ preservation system includes an organ container, an organ holder, a liquid supply tube, a drainage tube, and a pressure regulator. The organ container has a closed organ preservation space. The organ holder holds an organ in the organ preservation space. The liquid supply tube supplies a liquid to the organ. The drainage tube drains the liquid from the organ. The pressure regulator regulates air pressure in the organ preservation space. The organ container includes first to third connectors providing communication between the organ preservation space and an exterior space. The first, second, and third connectors are detachably connected to a liquid supply tube, a drainage tube, and a suction tube, respectively. When the organ is preserved ex vivo while being perfused with the liquid, the organ can be connected with ease to the tubes, and this ensures hermetical sealing of the space where the organ is preserved.

11 Claims, 11 Drawing Sheets

(56) References Cited

U.S. PATENT DOCUMENTS

2016/0183517 A1  6/2016  Potenziano et al.
2022/0000096 A1  1/2022  Kobayashi et al.

FOREIGN PATENT DOCUMENTS

| JP | 2013-539999 A | 10/2013 | |
|---|---|---|---|
| JP | 2017-518301 A | 7/2017 | |
| JP | 2020-083785 A | 6/2020 | |
| NL | 8401663 A * | 12/1985 | ............... A01N 1/02 |
| WO | 2015/126853 A1 | 8/2015 | |
| WO | 2015/187737 A1 | 12/2015 | |
| WO | 2019/044354 A1 | 3/2019 | |
| WO | 2020/105322 A1 | 5/2020 | |

* cited by examiner

ORGAN PRESERVATION SYSTEM

APPLICATIONS

This application claims the benefit of Japanese Application No. 2020-124161, filed on Jul. 21, 2020, the disclosure of which is incorporated by reference herein.

BACKGROUND OF THE INVENTION

Field of the Invention

The present invention relates to an organ preservation system for preserving an organ ex vivo while perfusing the organ with a liquid.

Description of the Background Art

In organ transplant operations such as liver transplantation, an organ is temporarily preserved ex vivo during a period of time from when the organ is removed from a donor to when the organ is transplanted into a recipient. At this time, the organ is perfused with a preservation solution in order to prevent the organ from becoming ischemic. A conventional system for preserving an organ ex vivo is described in, for example, Japanese Unexamined Patent Application (Published Japanese translation of a PCT Application) No. 2017-518301.

During preservation of an organ, the organ is preferably placed in an enclosed space in order to ensure sterilization and prevent the release of a preservation solution to the surroundings. In particular, when air pressure applied to the organ is regulated in order to improve the flow of the preservation solution in the organ, it becomes essential to place the organ in an enclosed space. However, in that case, it is necessary to place the organ in the enclosed space and to extend a tube for passing the preservation solution between the enclosed space and an exterior space.

In the organ care system disclosed in Japanese Unexamined Patent Application (Published Japanese translation of a PCT Application) No. 2017-518301, a liver that is being perfused is placed in an organ chamber (104). The organ chamber (104) includes a base member (2802) and a lid (2820). The lid (2820) is removably coupled to the base member (2802) via hinge portions (2832). The organ chamber (104) also has orifices (2830) (small holes) for use in conduit connection of vessels, such as a bile duct, into which cannulas are to be inserted. It is, however, very difficult to carry out connection operations via orifices (2830) within a limited period of time during organ transplant operations.

SUMMARY OF THE INVENTION

It is an object of the present invention to provide a technique for, when an organ is preserved ex vivo while being perfused with a liquid during organ transplant operations, allowing the organ to be connected with ease to each tube and ensuring hermetical sealing of a space in which the organ is preserved.

In order to solve the problem described above, one aspect of the present application is an organ preservation system for preserving an organ ex vivo while perfusing the organ with a liquid. The organ preservation system includes an organ container in which a closed organ preservation space can be formed, an organ holder that holds the organ in the organ preservation space, a liquid supply tube that supplies a liquid to the organ held by the organ holder, a drainage tube that drains a liquid out of the organ held by the organ holder, and a pressure regulator that regulates air pressure in the organ preservation space. The pressure regulator includes a pressure-reducing mechanism that is provided outside the organ container and sucks gas from the organ preservation space through a suction tube. The organ container includes a first connector detachably connected to the liquid supply tube and providing communication between the organ preservation space and an exterior space outside the organ container, a second connector detachably connected to the drainage tube and providing communication between the organ preservation space and the exterior space, and a third connector detachably connected to the suction tube and providing communication between the organ preservation space and the exterior space.

According to the first aspect of the present application, each tube and each catheter can be connected with ease to the organ or to each other via the connectors which are provided in the organ container and provide communication between the organ preservation space and the exterior space outside the organ container. This suppresses a mistaken release of the preservation solution. Moreover, hermetical sealing of the organ preservation space can be ensured with ease.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, an embodiment of the present invention will be described with reference to the drawings.

In the present application, "donors" and "recipients" may be humans, or may be non-human animals. That is, "organs"

according to the present application may be human organs, or may be organs of non-human animals. The non-human animals may be rodents such as mice and rats, ungulates such as pigs, goats, and sheep, non-human primates such as chimpanzees, or other non-human mammals, or may be nonmammalian animals.

1. Configuration of Organ Preservation System

Figure 1:
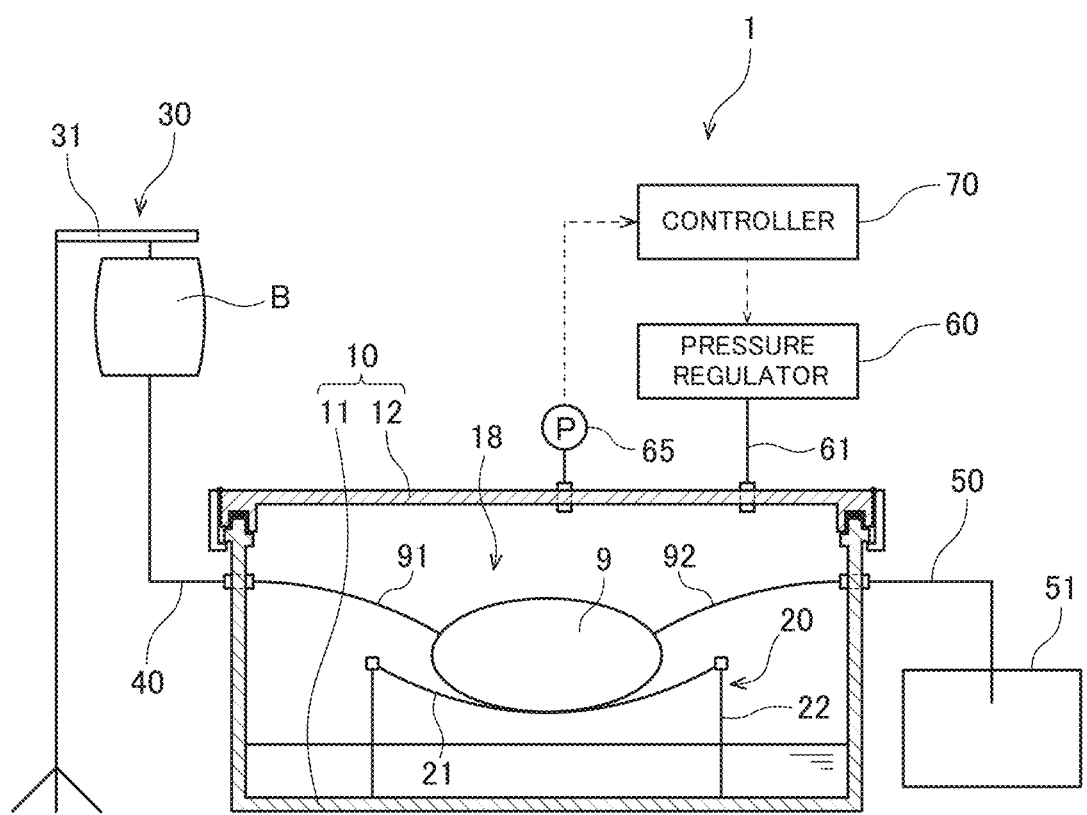
FIG. 1 is an illustration of a configuration of an organ preservation system.

FIG. 1 is an illustration of a configuration of an organ preservation system 1 according to one embodiment.

The organ preservation system 1 is a system for temporarily preserving an organ 9 ex vivo during a period of time from when the organ is removed from a donor to when the organ is transplanted into a recipient in an organ transplant operation. Examples of the organ 9 include a liver, a kidney, a heart, and a pancreas. However, the organ 9 to be preserved in the organ preservation system 1 may be any other organ, or may be part of an organ. The organ preservation system 1 preserves the organ 9 while perfusing blood vessels in the organ 9 with a preservation solution such as a saline.

In the operation of transplanting the organ 9, catheters are connected to arteries and veins of the organ 9. In the following description, a catheter connected to an artery of the organ 9 is referred to as a "first catheter 91," and a catheter connected to a vein of the organ 9 is referred to as a "second catheter 92." The preservation solution flows into the artery of the organ 9 through the first catheter 91, flows through capillary vessels in the organ 9, and is drained from the vein through the second catheter 92. Alternatively, the "first catheter 91" into which the preservation solution flows may be connected to the vein of the organ 9. For example, when the organ 9 is a liver as will be described in detail below, the "first catheter 91" may be connected to a portal vein of the venous system. Moreover, the "second catheter 92" through which the preservation solution is drained does not necessarily have to be connected to the organ 9. For example, a configuration is also possible in which the preservation solution is drained from the vein of the organ 9 and stored as-is in an organ container 10, which will be described later, and one end of the "second catheter" is installed at the location where the preservation solution is stored so that the preservation solution can be drained from the other end of the "second catheter" to the exterior space outside the organ container 10.

As illustrated in FIG. 1, the organ preservation system 1 according to the present embodiment includes the organ container 10, an organ holder 20, a liquid holder 30, a liquid supply tube 40, a drainage tube 50, a pressure regulator 60, a pressure gauge 65, and a controller 70.

Figure 2:
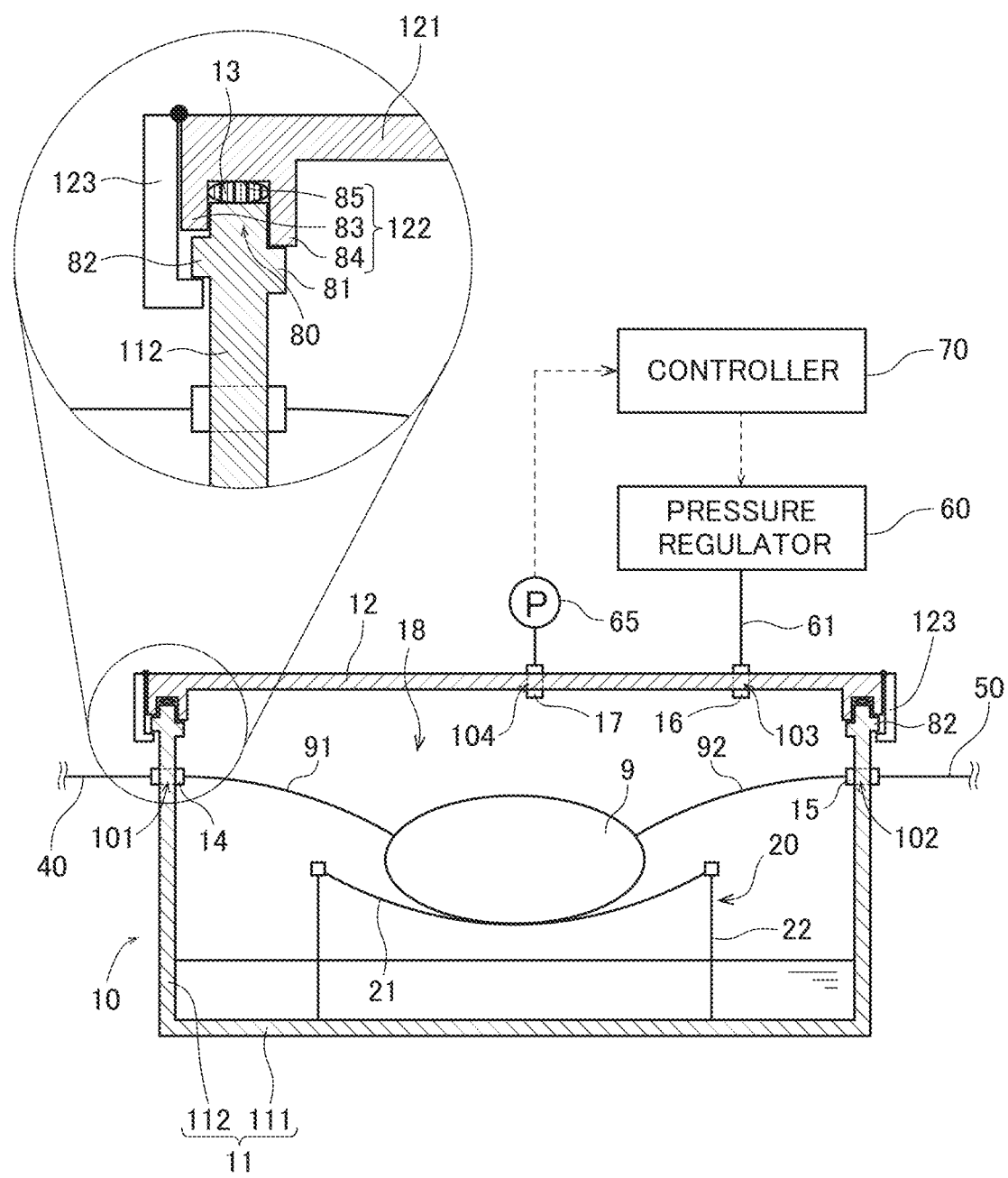
FIG. 2 is an enlarged view of the vicinity of an organ container illustrated in FIG. 1.

FIG. 2 is an enlarged view of the vicinity of the organ container 10 illustrated in FIG. 1. As illustrated in FIG. 2, the organ container 10 includes a container body 11, a container cover 12, a sealer 13, a first connector 14, a second connector 15, a third connector 16, and a fourth connector 17.

The container body 11 is a cup-like member having an upwardly open concave portion. The container body 11 has a bottom face 111 and a side face 112. The bottom face 111 extends horizontally in a plate-like form. Alternatively, the bottom face 111 may extend in the form of a downwardly convex curved surface (in a bowl form). The side face 112 projects upward in a tubular form from the outer periphery of the upper side of the bottom face 111. The side face 112 has an inner projection 81 and outer projections 82 in the vicinity of the upper end portion. The inner projection 81 projects inward from the entire perimeter in the vicinity of the upper end portion of the side face 112. The outer projections 82 project outward at a plurality of positions in the vicinity of the upper end portion of the side face 112. In the present embodiment, the outer projections 82 project outward at two positions on opposite sides with an internal space of the container body 11 sandwiched therebetween. The "internal space of the "container body 11" as used herein refers to an "organ preservation space, which will be described later.

The container cover 12 is a cup-like member that covers an upwardly open concave portion of the container body 11. The container cover 12 includes a plate-like portion 121 and a tubular portion 122. The plate-like portion 121 extends horizontally in a plate-like form. Alternatively, the plate-like portion 121 may extend in the form of an upwardly concave curved surface (in a bowl form). The tubular portion 122 projects downward in a tubular form from the outer periphery of the lower face of the plate-like portion 121. The tubular portion 122 includes an outer tubular portion 83 and an inner tubular portion 84 at the lower end. The outer tubular portion 83 extends in a tubular form on the outer periphery of the tubular portion 122. The inner tubular portion 84 is located with spacing inward of the outer tubular portion 83 and extends in a tubular form. Thus, the lower face of the plate-like portion 121 includes a ring-shaped face 85 that extends in a ring form between the outer tubular portion 83 and the inner tubular portion 84. That is, the outer tubular portion 83, the inner tubular portion 84, and the ring-shaped face 85 form an upwardly recessed groove 80.

When the container body 11 is assembled with the container cover 12, the sealer 13 (packing) having elasticity is provided on the upper face of the container body 11. The sealer 13 is provided on the upper face of the side face 112, i.e., provided along the entire periphery around the opening of the container body 11. For example, the sealer 13 may be made of a resin material such as rubber. When the container cover 12 is assembled with the container body 11 so as to cover the opening of the container body 11, the ring-shaped upper end of the side face 112 fits in the groove 80 of the container cover 12 so that the upper face of the side face 112 and the ring-shaped face 85 of the container cover 12 come in contact with each other via the sealer 13. In this way, the organ container 10 serving as a casing is configured. Then, an organ preservation space 18 that is a closed space is formed inside the organ container 10 in accordance with the shape of the concave portion of the container body 11.

The sealer 13 becomes deformed under pressure in contact with the upper face of the side face 112 and the ring-shaped face 85 of the container cover 12. This improves hermetical sealing of the organ preservation space 18. The inner tubular portion 84 of the container cover 12 extends inward and downward of the upper edge of the side face 112 and comes in contact with the inner projection 81. This further improves the hermetical sealing of the organ preservation space 18.

The container cover 12 further includes a plurality of hooks 123. In the present embodiment, the container cover 12 includes two hooks 123. The two hooks 123 are fixedly attached to the outer periphery of the plate-like portion 121 at two positions on opposite sides. After the container body 11 is assembled with the container cover 12, the two hooks 123 are engaged respectively with the two outer projections 82 of the container body 11. This allows the container cover 12 to be fixedly attached to the container body 11 and prevents detachment. Note that the number of hooks 123 provided on the container cover 12 and the number of outer projections 82 provided in the container body 11 each may be three or more.

As illustrated in FIG. 2, the container body 11 has a first through hole 101 and a second through hole 102. The first through hole 101 and the second through hole 102 each penetrate through the container body 11 in a horizontal direction. The container cover 12 also has a third through hole 103 and a fourth through hole 104. The third through hole 103 and the fourth through hole 104 each penetrate through the container cover 12 in a vertical direction.

The first through hole is fixedly attached to the first connector 14 without any clearance. The second through hole 102 is fixedly attached to the second connector 15 without any clearance. The third through hole 103 is fixedly attached to the third connector 16 without any clearance. The fourth through hole 104 is fixedly attached to the fourth connector 17 without any clearance. Each of the first connector 14, the second connector 15, the third connector 16, and the fourth connector 17 uses a joint with an open/close lever, which is not shown. When the aforementioned open/close lever is open, each of the first connector 14, the second connector 15, the third connector 16, and the fourth connector 17 provide communication between the organ preservation space 18 and the exterior space outside the organ container 10. Note that the positions of the first connector 14, the second connector 15, the third connector 16, and the fourth connector 17 are not limited to the positions described above. Each of the first connector 14, the second connector 15, the third connector 16, and the fourth connector 17 may be provided in either the container body 11 or the container cover 12. Alternatively, the first connector 14, the second connector 15, the third connector 16, or fourth connector 17 may be a joint without an open/close lever.

Figure 3:
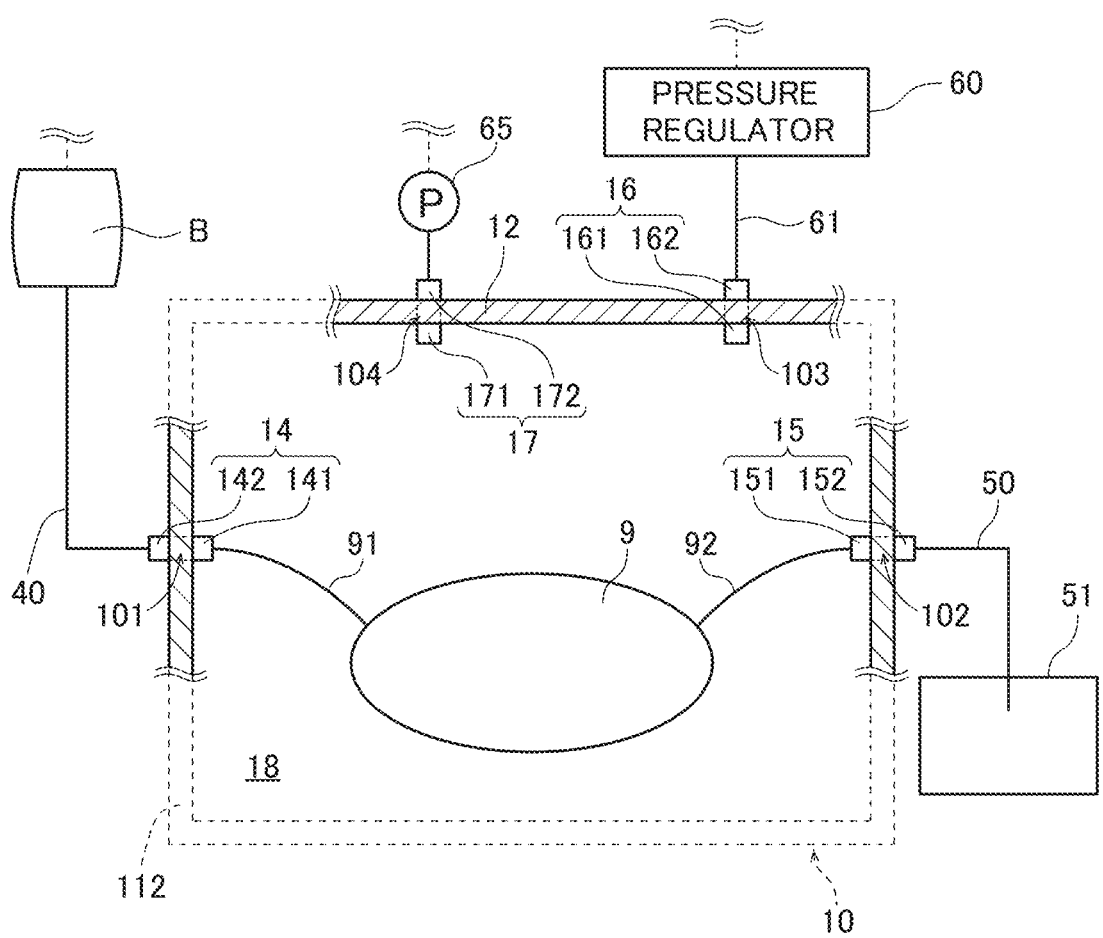
FIG. 3 is a schematic illustration of a configuration of each connector.

FIG. 3 is a schematic illustration of configurations of the first connector 14, the second connector 15, the third connector 16, and the fourth connector 17. As illustrated in FIG. 3, one end of the first connector 14 is located in the internal space of the container body 11. Hereinafter, a portion of the first connector 14 that is located in the internal space of the container body 11 is referred to as a "first inner connector 141." The other end of the first connector 14 is located in the exterior space outside the container body 11. Hereinafter, a portion of the first connector 14 that is located in the exterior space outside the container body 11 is referred to as a first outer connector 142.

One end of the second connector 15 is located in the internal space of the container body 11. Hereinafter, a portion of the second connector 15 that is located in the internal space of the container body 11 is referred to as a "second inner connector 151". The other end of the second connector 15 is located in the exterior space outside the container body 11. Hereinafter, a portion of the second connector 15 that is located in the exterior space outside the container body 11 is referred to as a "second outer connector 152."

One end of the third connector 16 is located in the internal space of the container body 11. Hereinafter, a portion of the third connector 16 that is located in the internal space of the container body 11 is referred to as a "third inner connector 161." The other end of the third connector 16 is located in the exterior space outside the container body 11. Hereinafter, a portion of the third connector 16 that is located in the exterior space outside the container body 11 is referred to as a third outer connector 162."

One end of the fourth connector 17 is located in the internal space of the container body 11. Hereinafter, a portion of the fourth connector 17 that is located in the internal space of the container body 11 is referred to as a "fourth inner connector 171." The other end of the fourth connector 17 is located in the exterior space outside the container body 11. Hereinafter, a portion of the fourth connector 17 that is located in the exterior space outside the container body 11 is referred to as a "fourth outer connector 172."

The organ holder 20 is a portion that holds the organ 9 in the organ preservation space 18 of the organ container 10. As illustrated in FIG. 2, the organ holder 20 includes a flexibly deformable holding sheet 21. The edge of the holding sheet 21 is connected to a support member 22 that is fixedly attached to the bottom face 111 of the container body 11. Thus, the holding sheet 21 is maintained in a substantially horizontal open condition. The organ 9 is placed on the upper face of the holding sheet 21. When the organ 9 is placed, the holding sheet 21 becomes deformed along the surface shape of the organ 9. This suppresses deformation of the organ 9 and allows the organ 9 to be held with reduced strain on the organ 9.

The material for the holding sheet 21 may, for example, be resin having biocompatibility and sterilization retention as well as flexibility. Examples of the material for the holding sheet 21 include polypropylene, polyethylene, polyurethane, polyvinylidene chloride, polystyrene, elastomeric resin, silicon, rubber, a gel material, and polyamide.

As illustrated in FIG. 1, the organ container 10 stores blood or a preservation solution at the bottom. This suppresses drying of the organ 9 in the organ container 10. In particular, when the pressure in the organ preservation space 18 of the organ container 10 is reduced as will be described later, moisture is likely to evaporate from the organ 9, but the blood or the preservation solution stored at the bottom of the organ container 10 suppresses the drying of the organ 9. Alternatively, the holding sheet 21 may be immersed in blood or a preservation solution in order to suppress the drying of the organ 9. As another alternative, the upper portion of the organ 9 may be covered with a sheet immersed in blood or a preservation solution in order to further suppress the drying of the organ 9.

The liquid holder 30 is a portion for holding the preservation solution before supply to the organ 9. The liquid holder 30 according to the present embodiment includes a pouch bag B and a bag holder 31 at positions that are higher in level than the position of the organ 9 held by the organ holder 20. The pouch bag B is a so-called intravenous drip bag in which the preservation solution is stored. The bag holder 31 holds the pouch bag B. Alternatively, instead of the pouch bag B, the liquid holder 30 may hold a bottle in which the preservation solution is stored. As another alternative, the liquid holder 30 may be a tank capable of storing the preservation solution.

The liquid supply tube 40 is a tube for supplying the preservation solution from the liquid holder 30 to the organ 9 held by the organ holder 20. The upstream end of the liquid supply tube 40 is connected the pouch bag B held by the bag holder 31 of the liquid holder 30. The downstream end of the liquid supply tube 40 is removably connected to the first outer connector 142 of the first connector 14, which is fixedly attached to the container body 11. The first inner connector 141 of the first connector 14 is removably connected to one end of the first catheter 91 whose other end is connected to the artery of the organ 9. This forms a flow path of the preservation solution from the pouch bag B through the liquid supply tube 40, the first connector 14, and the first catheter 91 to the organ 9.

As described above, the first connector 14 is already fixedly attached to the first through hole 101 without any clearance at the time of starting the operation of transplanting the organ 9. Thus, during the transplant operation, the flow path of the preservation solution to the organ 9 can be formed with ease by simply connecting the liquid supply tube 40 and the first catheter 91 to the both ends of the first connector 14. This speeds up the connection operations. Moreover, the hermetical sealing of the organ preservation space 18 can be maintained during the connection of the liquid supply tube 40 and the first catheter 91. This ensures sterilization in the organ preservation space 18 with more reliability.

In the present embodiment, no liquid supply pump is provided in the path of the liquid supply tube 40. A difference in altitude between the pouch bag B and the organ 9 causes gentle pressure (gravity) toward the organ 9 to be applied to the preservation solution in the liquid supply tube 40. Accordingly, the preservation solution flows from the pouch bag B through the liquid supply tube 40 to the artery of the organ 9. In this way, the omission of a liquid supply pump reduces loads of pressure applied to the organ 9 along with the inflow of the preservation solution.

The drainage tube 50 is a tube for draining the preservation solution from the organ 9 held by the organ holder 20. The downstream end of the drainage tube 50 is connected to the drain tank 51. The upstream end of the drainage tube 50 is removably connected to the second outer connector 152 of the second connector 15, which is fixedly attached to the container body 11. The second inner connector 151 of the second connector 15 is removably connected to one end of the second catheter 92 whose other end is connected to the vein of the organ 9. This forms a flow path of the preservation solution drained from the organ 9 through the second catheter 92, the second connector 15, and the drainage tube 50 to the drain tank 51. That is, the preservation solution drained from the vein of the organ 9 is collected in the drain tank 51 through the second catheter 92, the second connector 15, and the drainage tube 50. Note that, when the liquid holder 30 is a pouch bag B, a bottle, or a tank for storing the preservation solution, the preservation solution collected in the drain tank 51 may be circulated into the liquid holder 30 and reused.

As described above, the second connector 15 is already fixedly attached to the second through hole 102 without any clearance at the time of starting the operation of transplanting the organ 9. Thus, during the transplant operation, the path of drainage of the preservation solution from the organ 9 can be formed with ease by simply connecting the drainage tube 50 and the second catheter 92 to the opposite ends of the second connector 15. This speeds up the connection operations. Moreover, the hermetical sealing of the organ preservation space 18 can be maintained during the connection of the drainage tube 50 and the second catheter 92. This ensures sterilization in the organ preservation space 18 with more reliability.

Figure 4:
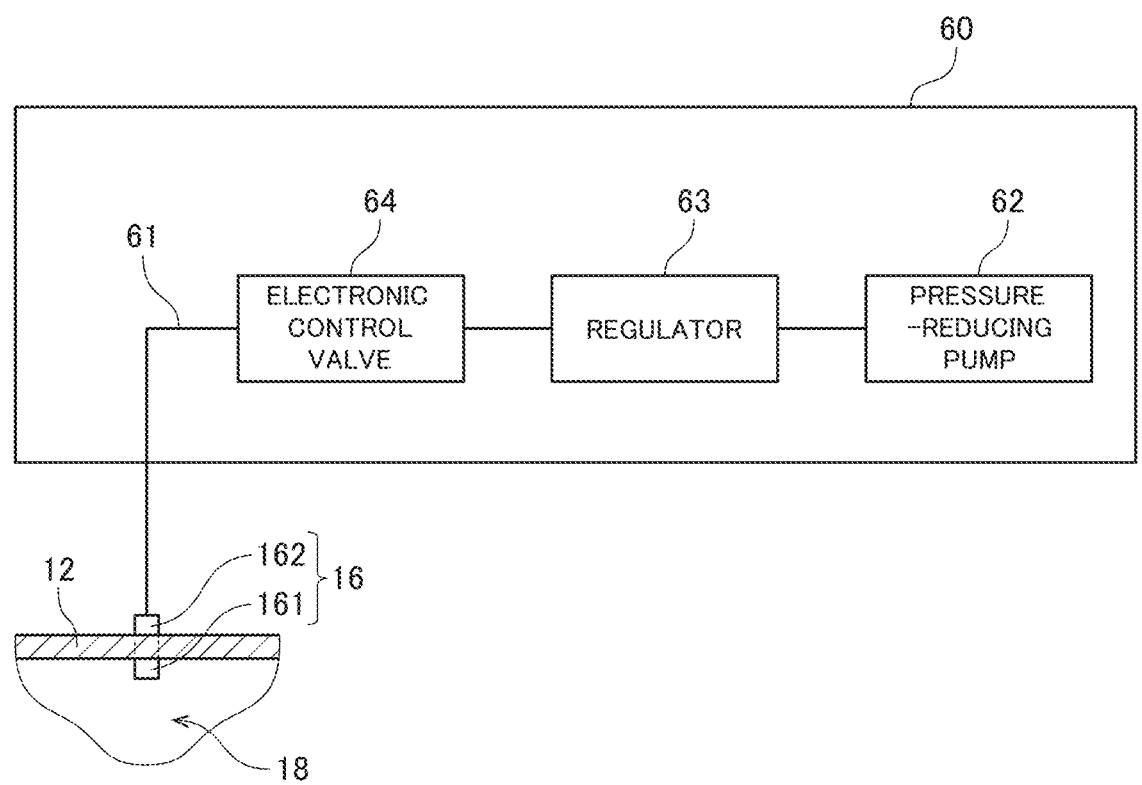
FIG. 4 is a block diagram illustrating a configuration of a pressure regulator.

The pressure regulator 60 is a mechanism provided outside the organ container 10 and for regulating air pressure in the organ preservation space 18 of the organ container 10. FIG. 4 is a block diagram illustrating a configuration of the pressure regulator 60. As illustrated in FIG. 4, the pressure regulator 60 according to the present embodiment includes a pressure-reducing mechanism that includes a suction tube 61, a pressure-reducing pump 62, a regulator 63, and an electronic control valve 64.

The upstream end of the suction tube 61 is removably connected to the third outer connector 162 of the third connector 16, which is fixedly attached to the container cover 12. The inner space of the third connector 16 communicates to the organ preservation space 18. The downstream end of the suction tube 61 is connected to the pressure-reducing pump 62. The regulator 63 and the electronic control valve 64 are provided in the path of the suction tube 61. Thus, when the pressure-reducing pump 62 is operated, gas is sucked from inside the organ preservation space 18 of the organ container 10 through the suction tube 61 and exhausted to the exterior space. As a result, the air pressure in the organ preservation space 18 of the organ container 10 drops. Note that the regulator 63 increases a negative pressure generated by the pressure-reducing pump 62 to a higher fixed negative pressure. That is, the regulator 63 increases the negative pressure generated by the pressure-reducing pump 62 to a fixed negative pressure with a small absolute value, when expressed in gage pressure. The electronic control valve 64 is a valve for precisely regulating the air pressure in the organ preservation space 18.

The configuration of the pressure regulator 60 is, however, not limited to the configuration described above. The pressure regulator 60 may include a purge valve for taking in outside air in order to return the air pressure in the organ preservation space 18 to atmospheric pressure. As another alternative, the pressure regulator 60 may further include, in addition to the above-described pressure-reducing mechanism, a pressurizer mechanism for supplying gas to the organ preservation space 18 in order to apply pressure, and a switching valve for switching between the pressure-reducing mechanism and the pressurizer mechanism.

As described above, the third connector 16 is already fixedly attached to the third through hole 103 without any clearance at the time of starting the operation of transplanting the organ 9. Thus, during the transplant operation, a suction path for sucking gas from the organ preservation space 18 can be formed with ease by simply connecting the suction tube 61 to the third outer connector 162 of the third connector 16 to the suction tube 61. Moreover, the hermetical sealing of the organ preservation space 18 can be maintained during the connection of the suction tube 61. This ensures sterilization in the organ preservation space 18 with more reliability.

The pressure gauge 65 measures the air pressure in the organ preservation space 18 of the organ container 10. The pressure gauge 65 is detachably connected to the fourth outer connector 172 of the fourth connector 17, which is fixedly attached to the container cover 12. An inner space of the fourth connector 17 communicates to the organ preservation space 18. The result of measurement by the pressure gauge 65 is output to the controller 70, which will be described later. The controller 70 adjusts the degree of opening of the electronic control valve 64 on the basis of the measurement result obtained from the pressure gauge 65.

As described above, the fourth connector 17 is already fixedly attached to the fourth through hole 104 without any clearance at the time of starting the operation of transplanting the organ 9. Thus, during the transplant operation, the air pressure in the organ preservation space 18 can be measured by simply connecting the pressure gauge 65 to the fourth outer connector 172 of the fourth connector 17. Moreover, the hermetical sealing of the organ preservation space 18 can be ensured during the connection of the pressure gauge 65. This ensures sterilization in the organ preservation space 18 with more reliability.

The controller 70 is means for controlling the operation of the pressure regulator 60. For example, the controller 70 may be configured as an electronic circuit board or a computer that includes a processor such as a CPU and a memory such as a RAM. The controller 70 is electrically connected to each of the pressure-reducing pump 62, the regulator 63, and the electronic control valve 64, which are described above. The controller 70 controls the operation of each component in accordance with programs that are set in advance. Accordingly, the air pressure in the organ preservation space 18 is regulated.

2. Procedure for Organ Preservation

Figure 5:
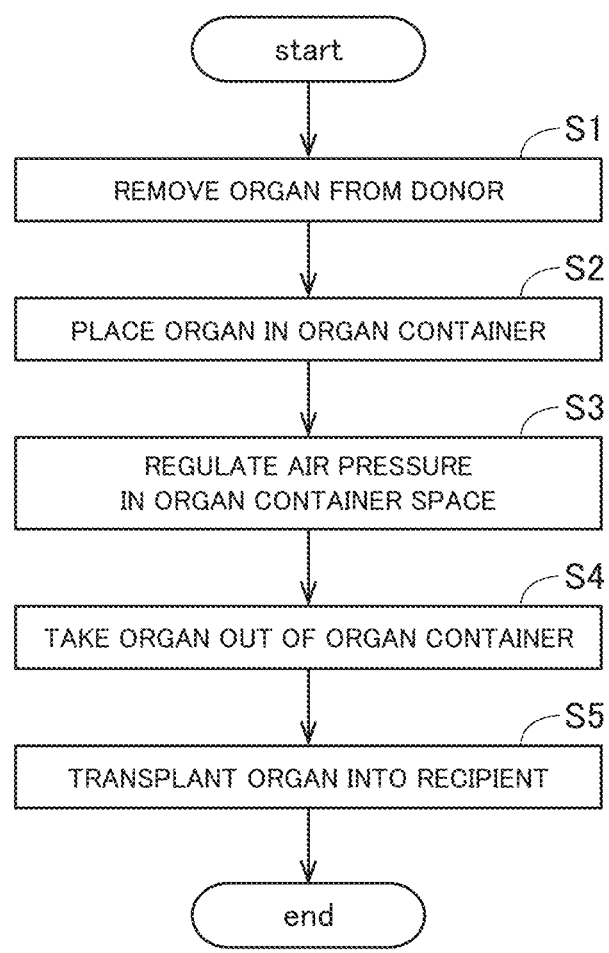
FIG. 5 is a flowchart of a procedure for preserving an organ with use of the organ preservation system.

A next description is given of the procedure for preserving the organ 9 with use of the organ preservation system 1 described above. FIG. 5 is a flowchart illustrating the procedure for preserving the organ 9 in the organ preservation system 1. As described above, the first, second, third, and fourth connectors 14, 15, 16, and 17 are already fixedly attached to the through holes 101 to 104 without any clearance at the time of starting the operation of transplanting the organ 9, and the open/close lever of each connector is closed. The liquid supply tube 40 is provided with a clamp (not shown) in order to intercept a downward flow of the preservation solution.

As illustrated in FIG. 5, first, the organ 9 is removed from a donor (step S1). Specifically, first, a surgeon severs the artery of the organ 9 and connects one end of the first catheter 91 to the severed end of the artery. The surgeon also severs the vein of the organ 9 and connects one end of the second catheter 92 to the severed end of the vein. Then, the organ 9 is removed from the body of the donor.

Next, the organ 9 is placed in the organ container 10 (step S2). Specifically, first, the container cover 12 is detached from the organ container 10 to open the top of the container body 11. Then, the organ 9 is placed on the upper face of the holding sheet 21 of the organ holder 20. Then, the other end of the first catheter 91 is connected to the first inner connector 141 of the first connector 14. The other end of the second catheter 92 is connected to the second inner connector 151 of the second connector 15.

Thereafter, the top of the container body 11 is closed with the container cover 12, and the container cover 12 is fixedly attached with the hooks 123. This forms the organ preservation space 18 that is a closed space in the organ container 10. That is, the organ 9 is placed in the organ preservation space 18. Then, the downstream end of the liquid supply tube 40 is connected to the first outer connector 142 of the first connector 14. The upstream end of the drainage tube 50 is connected to the second outer connector 152 of the second connector 15. The upstream end of the suction tube 61 is connected to the third outer connector 162 of the third connector 16. The pressure gauge 65 is connected to the fourth outer connector 172 of the fourth connector 17. Thereafter, for example, the open/close lever of the first connector 14 and the open/close lever of the second connector 15 are each opened, and the aforementioned clamps of the liquid supply tube 40 are released to start the flow of the preservation solution into the organ 9.

Then, the open/close lever of the third connector 16 and the open/close lever of the fourth connector 17 are each opened to regulate the air pressure in the organ preservation space 18 of the organ container 10 (step S3). Specifically, the controller 70 controls the operation of the pressure regulator 60 on the basis of the measurement result obtained from the pressure gauge 65. Accordingly, gas is sucked and discharged from the organ preservation space 18. As a result, the air pressure in the organ preservation space 18 drops. At this time, the pressure regulator 60 may be intermittently operated so as to change the air pressure in the organ preservation space 18 at regular intervals of, for example, 3 to 6 seconds in accordance with the breathing cycle of the living body. This cycle does not necessarily have to agree with the breathing cycle of the living body, and may be set to an appropriate value depending on the situation. Alternatively, the pressure regulator 60 may be continuously operated so as to keep the air pressure in the organ preservation space 18 at a fixed negative pressure lower than atmospheric pressure.

If the air pressure in the organ preservation space 18 is kept at a negative pressure, the area of the flow path of blood vessels in the organ 9 increases with expansion of the organ 9. Accordingly, resistance to the flow path of blood vessels in the organ 9 decreases. This facilitates the flow of the preservation solution from the liquid supply tube 40 to the blood vessels in the organ 9 and therefore reduces loads of pressure applied to the organ 9 along with the inflow of the preservation solution. That is, if the air pressure in the organ preservation space 18 is set to a negative pressure, it is possible to ensure the flow rate of the preservation solution in the organ 9 without increasing the pressure in the preservation solution.

When the recipient has prepared for the transplantation of the organ 9, the organ 9 is taken out of the organ container 10 (step S4). Specifically, first, decompression caused by the pressure regulator 60 is cancelled to return the air pressure in the organ preservation space 18 to atmospheric pressure. Moreover, the container cover 12 is removed from the organ container 10 to open the top of the container body 11. Then, the first catheter 91 is removed from the first connector 14, and the second catheter 92 is removed from the second connector 15 so as to take out the organ 9 from the upper face of the holding sheet 21 of the organ holder 20.

Thereafter, the organ 9 is transplanted into the recipient (step S5). Specifically, the organ 9 is placed in the body cavity of the recipient. Then, the surgeon removes the first catheter 91 from the artery of the organ 9 and anastomoses the artery of the organ 9 to the artery of the recipient. The surgeon also removes the second catheter 92 from the vein of the organ 9 and anastomoses the vein of the organ 9 to the vein of the recipient.

3. Experimental Result of Air Pressure Regulation

Figure 6:
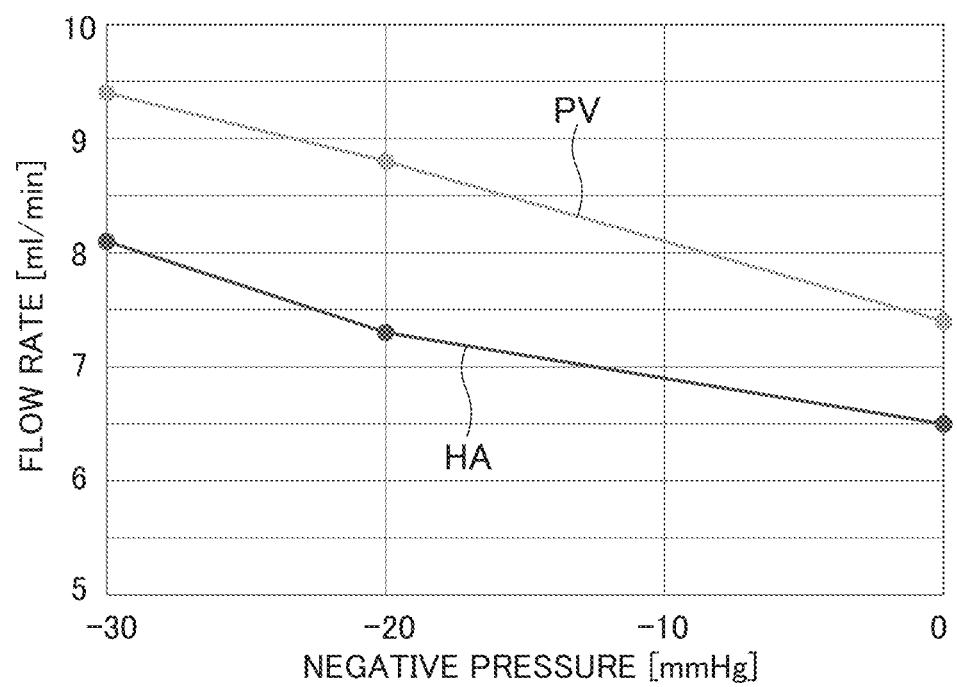
FIG. 6 is a graph showing changes in the flow rate of a liquid flowing in an organ when the organ is placed in an organ preservation space and pressure in this space is changed while the organ is perfused with the liquid.
Figure 7:
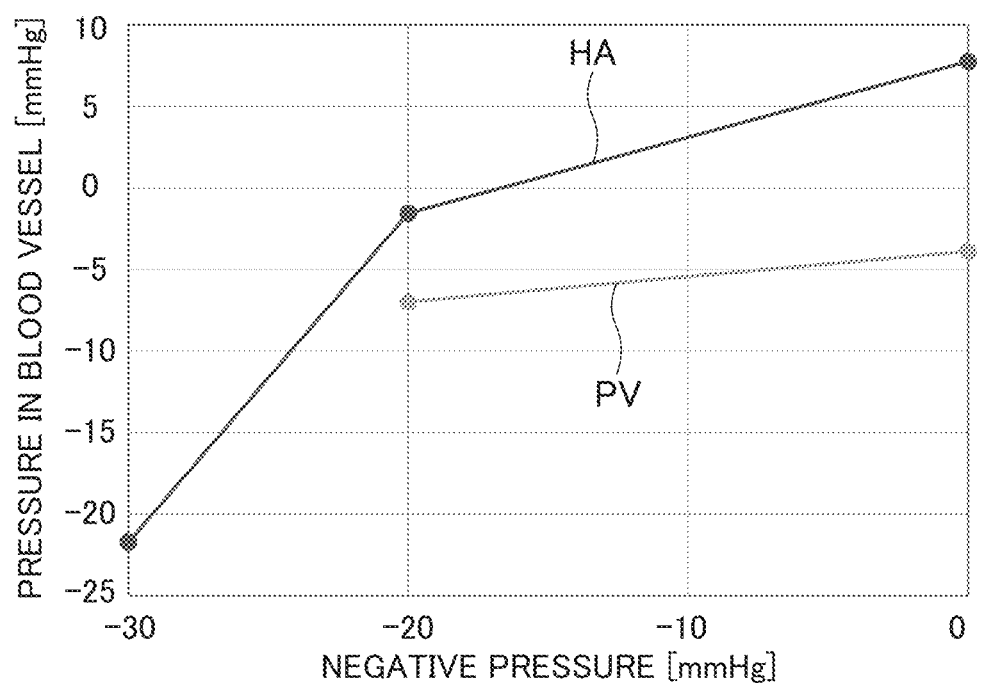
FIG. 7 is a graph showing changes in pressure in blood vessels in an organ when the organ is placed in the organ preservation space and pressure in this space is changed while the organ is perfused with a liquid.

FIG. 6 is a graph showing changes in the flow rate of the liquid flowing in the organ 9 when a liver, which is one example of the organ 9, is placed in the organ preservation space 18 and the pressure in the organ preservation space 18 is changed while the organ 9 is perfused with the liquid. FIG. 7 is a graph showing changes in pressure in blood vessels in the organ 9 when a liver, which is one example of the organ 9, is placed in the organ preservation space 18 and the pressure in the organ preservation space 18 is changed while the organ 9 is perfused with the liquid.

In the case of a liver of a living body, blood is usually supplied from the portal vein and the hepatic artery. The portal vein is a thick vein and supplies vein blood having circulated through the intestine and the spleen and containing lots of nutrients, to the liver. The hepatic artery supplies artery blood containing lots of oxygen from the main artery to the liver. These two types of blood merge in the liver, flow through capillary vessels in the liver, and then return to the heart through the suprahepatic inferior vena cava (SH-IVC) or the infrahepatic inferior vena cava (IH-IVC). In this experiment, arteries and veins including the hepatic artery and portal vein of the liver of a living body are severed and taken out, and the "first catheter 91" is connected to each of the portal vein and the hepatic artery. In FIGS. 6 and 7, PV indicates the result of measuring the flow rate and the pressure in the portal vein, and HA indicates the result of measuring the flow rate and the pressure in the hepatic artery. Note that, during the perfusion process other than this experiment, the "first catheter 91" may be connected to either one of the portal vein and hepatic artery of the liver.

As illustrated in FIGS. 6 and 7, it is found that, as the pressure in the organ preservation space 18 decreases, the flow rate of the liquid flowing in the organ 9 increases and the pressure in blood vessels in the organ 9 decreases. Accordingly, it is possible ensure the flow rate of the liquid in the organ 9 while reducing loads of pressure applied to the organ 9 along with the inflow of the liquid.

4. Variations

While one embodiment of the present invention has been described thus far, the present invention is not intended to be limited to the embodiment described above.

4-1. First Variation

Figure 8:
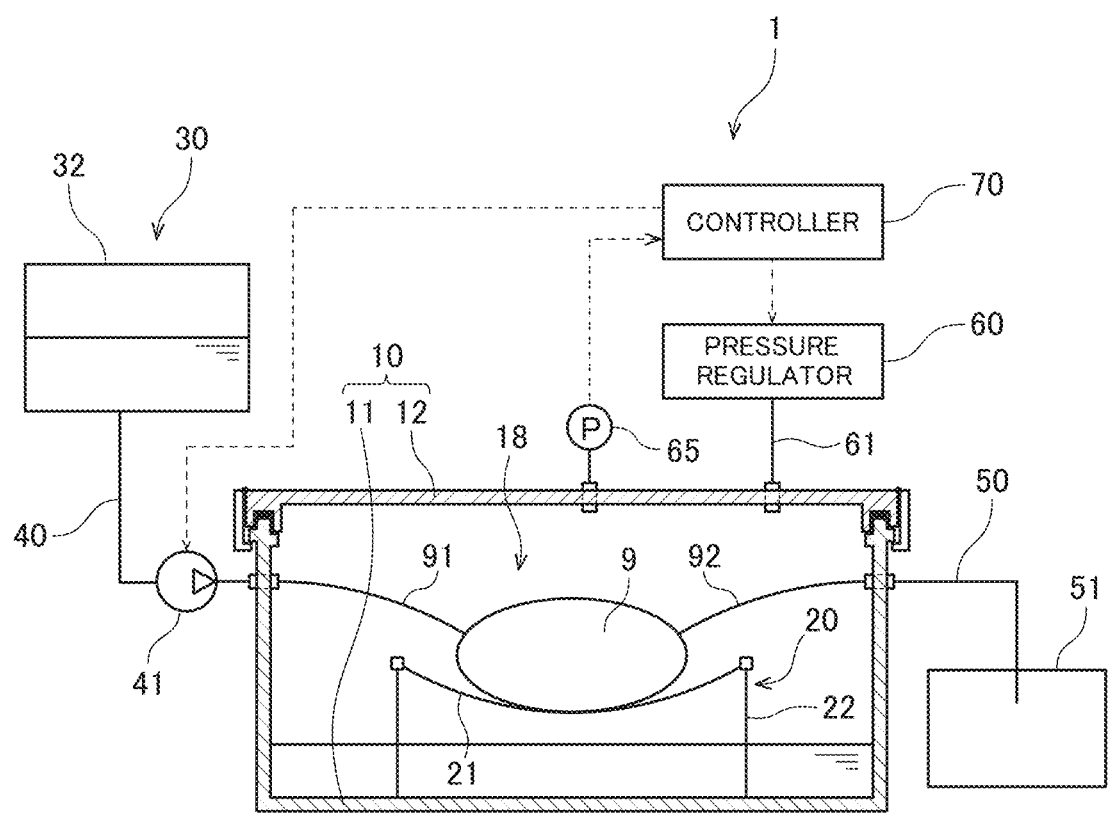
FIG. 8 is an illustration of a configuration of an organ preservation system according to a first variation.

FIG. 8 is an illustration of a configuration of the organ preservation system 1 according to a first variation. In the example illustrated in FIG. 8, the liquid holder 30 is a tank 32 for storing the preservation solution before supply. The upstream end of the liquid supply tube 40 is connected to the tank 32. Moreover, a liquid supply pump 41 is provided in the path of the liquid supply tube 40. During the preservation of the organ 9, the liquid supply pump 41 operates in response to a command received from the controller 70. Accordingly, the preservation solution is pumped into blood vessels in the organ 9. In this way, even in the case where the liquid supply pump 41 is used, the pressure in the preservation solution flowing in blood vessels in the organ 9 can be reduced by reducing the air pressure in the organ preservation space 18 with use of the pressure regulator 60. Accordingly, it is possible to reduce loads of pressure applied to the organ 9 along with the inflow of the preservation solution.

4-2. Second Variation

Figure 9:
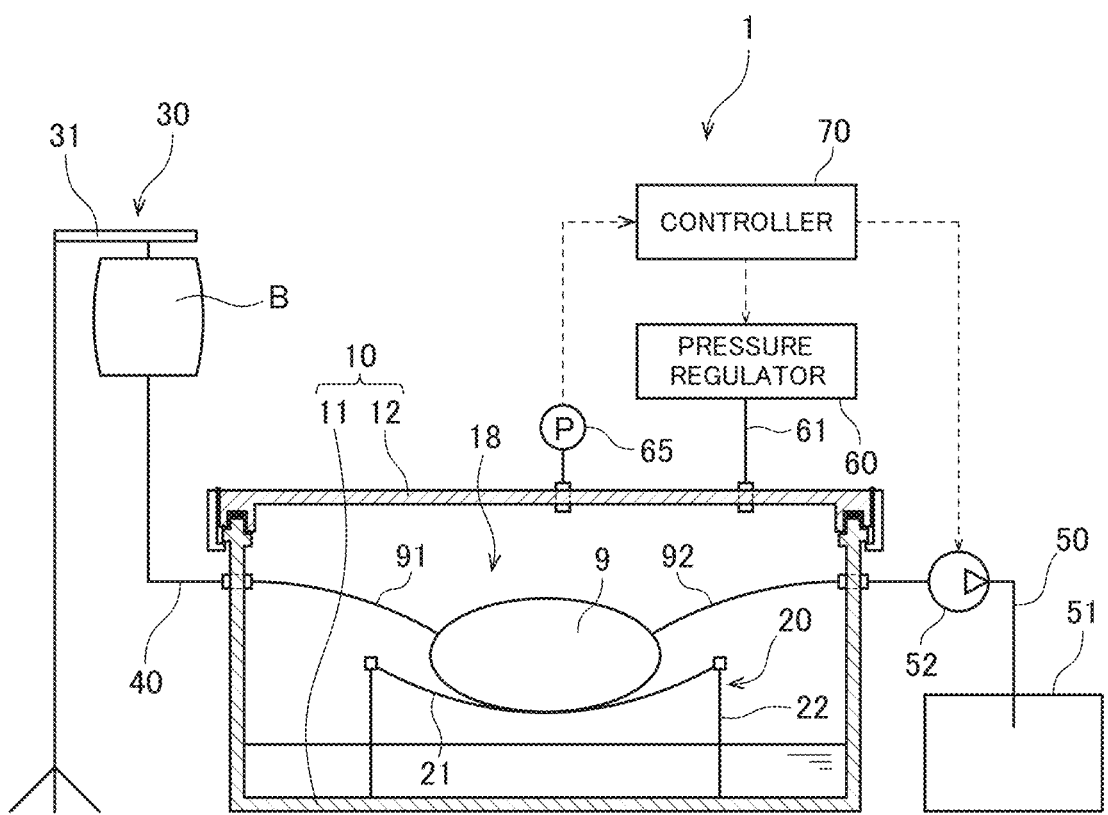
FIG. 9 is an illustration of a configuration of an organ preservation system according to a second variation.

FIG. 9 is an illustration of a configuration of the organ preservation system 1 according to a second variation. In the example illustrated in FIG. 9, a drain pump 52 is provided in the path of the drainage tube 50. During the preservation of the organ 9, the drain pump 52 operates in response to a command received from the controller 70. Accordingly, a flow of the preservation solution is formed in blood vessels in the organ 9. In this way, in the case where the drain pump 52 is used, blood vessels in the organ 9 may be narrowed due to the suction force of the drain pump 52. However, such blood vessels in the organ 9 can be expanded by reducing the air pressure in the organ preservation space 18 with use of the pressure regulator 60. Accordingly, it is possible to ensure the flow rate of the preservation solution in the organ 9.

4-3. Third Variation

Figure 10:
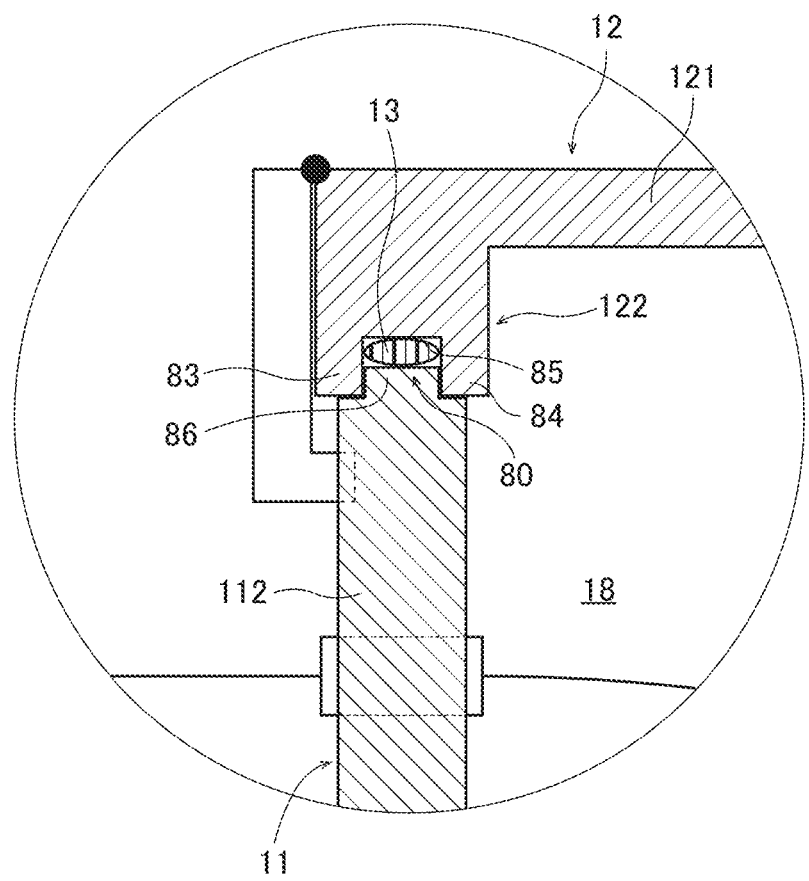
FIG. 10 is a partial enlarged view illustrating a configuration of a container body and a container cover according to a third variation.

FIG. 10 is a partial enlarged view illustrating configurations of the container body 11 and the container cover 12 according to a third variation. In the example illustrated in FIG. 10, the inner projection 81 and the outer projection 82 as in the embodiment described above are not provided at the upper end of the side face 112 of the container body 11. However, the upper end of the side face 112 has an upper projection 86 provided in a middle portion between inner and outer portions. The upper projection 86 projects upward from the entire periphery of the upper end of the tubular side face 112.

The container cover 12 has a configuration similar to that of the container cover 12 disclosed in the above-described embodiment. The lower face of the plate-like portion 121 of the container cover 12 includes the ring-shaped face 85 extending in a ring form between the outer tubular portion 83 and the inner tubular portion 84. That is, the outer tubular portion 83, the inner tubular portion 84, and the ring-shaped face 85 form the upwardly recessed groove 80. In this variation, the lower end of the outer tubular portion 83 and the lower end of the inner tubular portion 84 are at substantially the same position in the vertical direction.

When the container body 11 is assembled with the container cover 12, the sealer 13 (packing) is provided on the upper face of the upper projection 86 of the container body 11. The sealer 13 is provided on the upper face of the upper projection 86, i.e., provided on the entire periphery around the opening of the container body 11. When the container cover 12 is assembled with the container body 11 so as to cover the opening of the container body 11, the upper projection 86 fits in the groove 80 of the container cover 12 so that the upper face of the upper projection 86 and the ring-shaped face 85 of the container cover 12 come in contact with each other via the sealer 13.

The sealer 13 also becomes deformed in contact with the upper face of the upper projection 86 and the ring-shaped face 85 of the container cover 12. This improves the hermetical sealing of the organ preservation space 18. The inner tubular portion 84 of the container cover 12 extends inward and downward of the upper end of the upper projection 86 and comes in contact with the upper face of the side face 112. The inner tubular portion 84 comes in contact with the upper face of a portion of the upper end of the side face 112 that is located inward of the upper projection 86. The outer tubular portion 83 of the container cover 12 extends outward and downward of the upper end of the upper projection 86 and comes in contact with the upper face of the side face 112. The outer tubular portion 83 comes in contact with the upper face of a portion of the upper end of the side face 112 that is located outward of the upper projection 86. This further improves the hermetical sealing of the organ preservation space 18.

4-4. Fourth Variation

Figure 11:
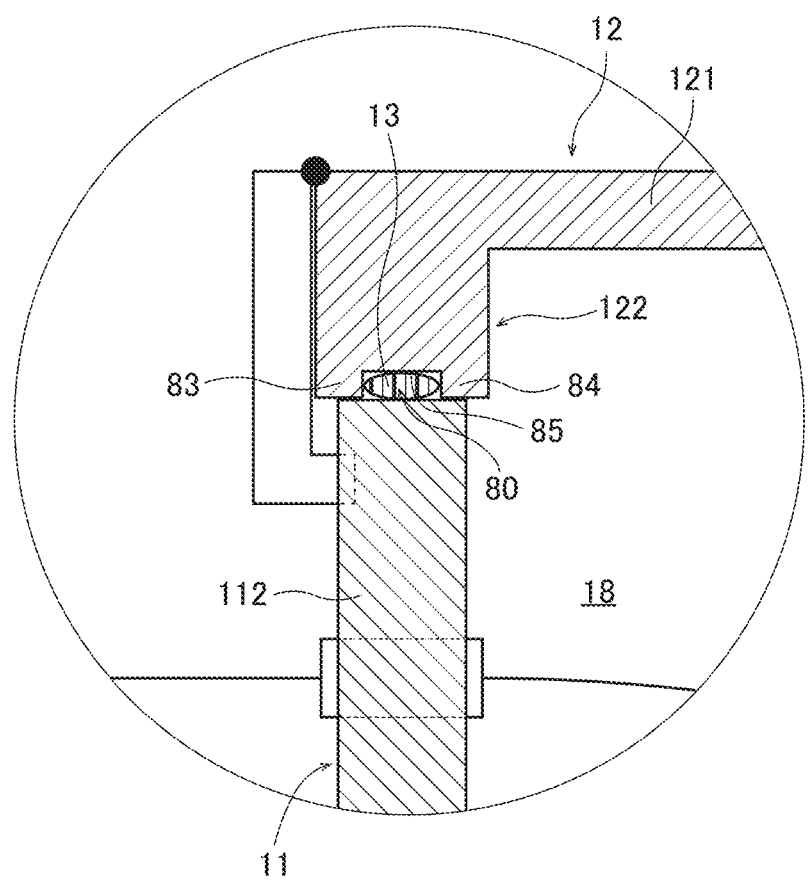
FIG. 11 is a partial enlarged view illustrating a configuration of a container body and a container cover according to a fourth variation.

FIG. 11 is a partial enlarged view illustrating configurations of the container body 11 and the container cover 12 according to a fourth variation. In the example illustrated in FIG. 11, the upper end of the side face 112 of the container body 11 does not have the inner projection 81, the outer projection 82, and the 2 upper projection 86 as in the above-described embodiment and the third variation. The upper face of the side face 112 according to this variation is substantially horizontal in the vertical direction. The container cover 12 according to this variation has a configuration similar to that of the container cover 12 disclosed in the third variation described above.

When the container body 11 is assembled with the container cover 12, the sealer 13 (packing) is provided on the upper face of the side face 112 of the container body 11. The sealer 13 is provided on the upper face of the side face 112, i.e., provided on the entire periphery around the opening of the container body 11. When the container cover 12 is assembled with the container body 11 so as to cover the opening of the container body 11, the sealer 13 fits in the groove 80 of the container cover 12 so that the upper face of the side face 112 and the ring-shaped face 85 of the container cover 12 come in contact with each other via the sealer 13.

The sealer 13 also becomes deformed in contact with the upper face of the side face 112 and the ring-shaped face 85 of the container cover 12. This improves the hermetical sealing of the organ preservation space 18. Moreover, the inner tubular portion 84 and the outer tubular portion 83 of the container cover 12 come in contact with the upper face of the side face 112. This further improves the hermetical sealing of the organ preservation space 18.

4-5. Other Variations

In the embodiment described above, joints for connecting tubes and catheters are used as the first connector 14, the second connector 15, the third connector 16, and the fourth connector 17. Alternatively, the first connector 14, the second connector 15, the third connector 16, and the fourth connector 17 may be other than joints as long as they can provide coupling to tubes and catheters. For example, the first connector 14, the second connector 15, the third connector 16, and the fourth connector 17 may be tubes that are fixedly attached without any clearance to the through holes 101 to 104 penetrating through the container body 11 or the container cover 12.

The organ preservation system 1 according to the embodiment described above includes one liquid supply tube 40, one first catheter 91, one drainage tube 50, and one second catheter 92. However, the organ preservation system 1 may include a plurality of liquid supply tubes 40 and a plurality of first catheters 91 depending on the number of arteries of the organ 9. Moreover, the organ preservation system 1 may include a plurality of drainage tubes 50 and a plurality of second catheters 92 depending on the number of veins of the organ 9.

A detailed structure of the organ preservation system including the organ container does not necessarily have to completely match the structure illustrated in each drawing of the present application. Each component according to the above-described embodiment and variations may be combined appropriately within a range that causes no contradictions.

While the invention has been shown and described in detail, the foregoing description is in all aspects illustrative and not restrictive. It is therefore understood that numerous modifications and variations can be devised without departing from the scope of the invention.

What is claimed is:

1. An organ preservation system for preserving an organ ex vivo while perfusing said organ with a liquid, the organ preservation system comprising:
    an organ container in which a closed organ preservation space can be formed;
    an organ holder that holds said organ in said organ preservation space;
    a liquid supply tube that supplies a liquid to said organ held by said organ holder;
    a drainage tube that drains a liquid out of said organ held by said organ holder; and
    a pressure regulator that regulates air pressure in said organ preservation space,
    wherein said pressure regulator includes:
        a pressure-reducing mechanism that is provided outside said organ container and sucks gas from said organ preservation space through a suction tube,
    wherein said organ container includes:
        a first connector detachably connected to said liquid supply tube and providing communication between said organ preservation space and an exterior space outside said organ container;
        a second connector detachably connected to said drainage tube and providing communication between said organ preservation space and said exterior space;
        a third connector detachably connected to said suction tube and providing communication between said organ preservation space and said exterior space;
        a container body having an upwardly open concave portion that forms said organ preservation space;
        a container cover that covers said upwardly open concave portion,
    wherein said container body has:
        a bottom face extending horizontally in a plate form or extending in a form of a downward concave curved surface; and
        a side face projecting upward in a tubular form from an outer periphery of an upper side of said bottom face,
    wherein said side face has, in the vicinity of the upper end portion:
        an inner projection projecting inward from the entire perimeter in the vicinity of the upper end portion of the side face,
    wherein said container cover includes:
        a plate portion extending horizontally in a plate form or extending in a form of an upwardly concave curved surface; and
        a tubular portion projecting downward in a tubular form from an outer periphery of a lower side of said plate portion,
    wherein said tubular portion has a lower end including:
        an outer tubular portion; and
        an inner tubular portion located inward of said outer tubular portion, and
    wherein said inner tubular portion extends inward and downward of an upper edge of said side face and comes in contact with said inner projection.

2. The organ preservation system according to claim 1, wherein
    said first connector, said second connector, and said third connector are each provided in said container body or in said container cover.

3. The organ preservation system according to claim 1, wherein said organ container further includes:
    a sealer provided around said upwardly open concave portion and in contact with an upper face of said container body and a lower face of said container cover.

4. The organ preservation system according to claim 1, wherein
    said first connector is a joint or tubing fixedly attached to a first through hole penetrating through said container body, or a projection projecting in a tubular form from a peripheral edge of said first through hole in said container body,
    said liquid supply tube is connected to a first outer connector of said first connector, the first outer connector being located in the exterior space outside said container body, and
    a first inner connector of said first connector is connected to one end of a first catheter, the first inner connector being located in an internal space of said container body, and the first catheter having the other end connected to an artery or a vein of said organ.

5. The organ preservation system according to claim 1, wherein
    said second connector is a joint or tubing fixedly attached to a second through hole penetrating through said container body, or a projection projecting in a tubular form from a peripheral edge of said second through hole in said container body,
    said drainage tube is connected to a second outer connector of said second connector, the second outer connector being located in the exterior space outside said container body, and
    a second inner connector of said second connector is connected to one end of a second catheter, the second inner connector being located in an internal space of said container body, the second catheter having the other end connected to a vein of said organ or provided in the internal space of said container body.

6. The organ preservation system according to claim 1, wherein
- said third connector is a joint or tubing fixedly attached to a third through hole penetrating through said container cover, or a projection projecting in a tubular form from a peripheral edge of said third through hole in said container cover,
- said suction tube is connected to a third outer connector of said third connector, the third outer connector being located in the exterior space outside said container body, and
- said organ preservation space communicates to an inner space of said third connector.

7. The organ preservation system according to claim 3, wherein
- said tubular portion has said lower end further including:
- a ring-shaped face extending in a ring form between said outer tubular portion and said inner tubular portion, and
- said sealer becomes deformed under pressure in contact with said upper face of said container body and said ring-shaped face.

8. The organ preservation system according to claim 1, further comprising:
- a liquid holder that holds a liquid before supply at a position higher than a position of said organ held by said organ holder,
- wherein said liquid supply tube has an upstream end connected to said liquid holder.

9. The organ preservation system according to claim 1, further comprising:
- a liquid supply pump provided in said liquid supply tube; and
- a tank that stores a liquid before supply,
- wherein said liquid supply tube has an upstream end connected to said tank.

10. The organ preservation system according to claim 1, further comprising:
- a drain pump provided in said drainage tube.

11. The organ preservation system according to claim 1, further comprising:
- a pressure gauge that measures air pressure in said organ preservation space,
- wherein said organ container further includes:
- a fourth connector providing communication between said organ preservation space and said exterior space, the fourth connector being a joint or tubing fixedly attached to a fourth through hole penetrating through said container cover, or a projection projecting in a tubular form from a peripheral edge of said fourth through hole in said container cover, and
- said pressure gauge is connected to said fourth connector.

* * * * *